(No Model.)

H. V. HINCKLEY.
UNDERFLOW TESTING APPARATUS.

No. 585,270. Patented June 29, 1897.

WITNESSES:
M. D. Blondell
Amos W. Hart

INVENTOR
H. V. Hinckley.
BY Munn & Co.
ATTORNEYS.

UNITED STATES PATENT OFFICE.

HOWARD V. HINCKLEY, OF TOPEKA, KANSAS.

UNDERFLOW-TESTING APPARATUS.

SPECIFICATION forming part of Letters Patent No. 585,270, dated June 29, 1897.

Application filed August 31, 1896. Serial No. 604,472. (No model.)

*To all whom it may concern:*

Be it known that I, HOWARD V. HINCKLEY, a citizen of the United States, residing at Topeka, county of Shawnee, State of Kansas, have invented a new and useful Apparatus for Testing Underflow in Different Soil Strata, of which the following is a specification.

My invention relates to an apparatus for determining by actual measurement the flow of subterranean waters, (sometimes called "underflow,") and consequently the determination of the extent and permanency of the water-supply which is available at any point from beneath the surface of the ground. This determination with some degree of accuracy becomes necessary before investing capital extensively in water-supply works, whether for irrigation or domestic or other purposes. The width and depth of the water-bearing stratum and the rate of slope being known, the speed of flow in the given material is the missing factor, which may be determined by the apparatus illustrated in the accompanying drawings, in which—

Figure 1:
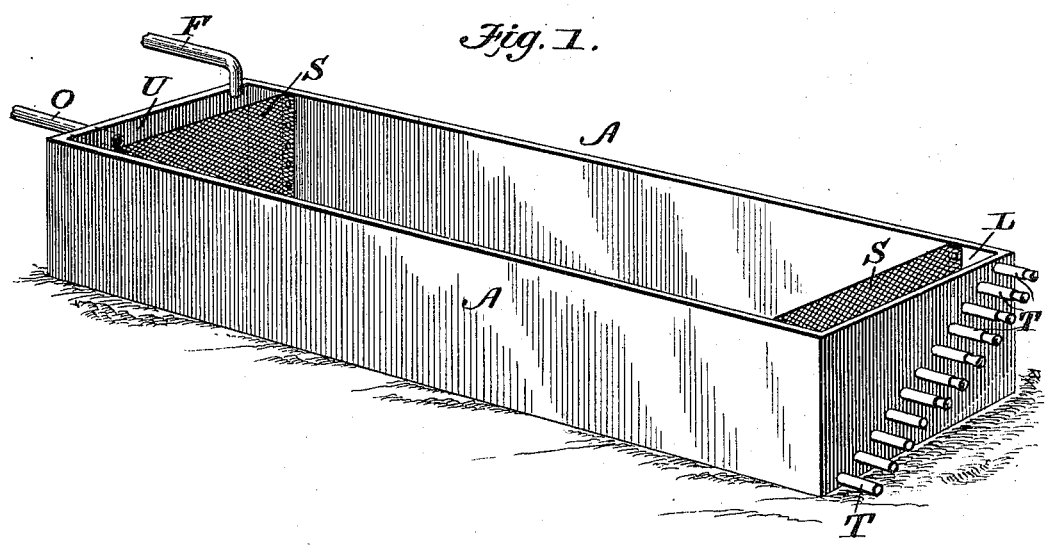
Figure 2:
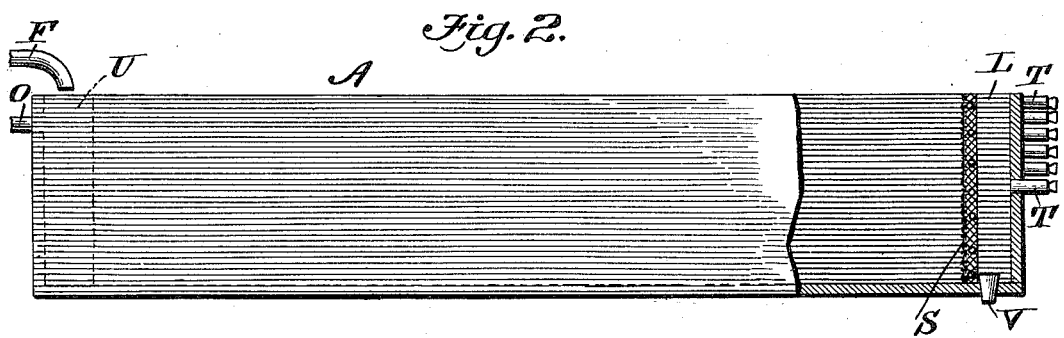
Figure 3:
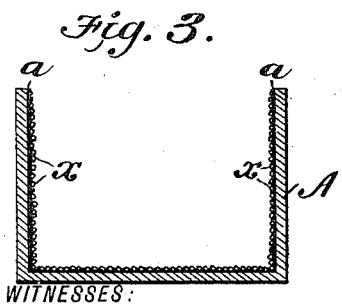
Figure 4:
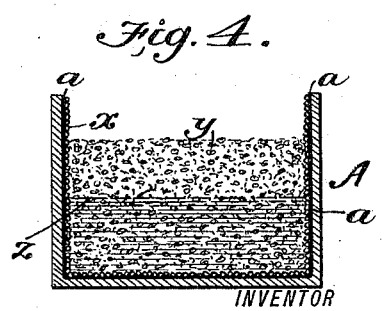

Figure 1 is a perspective view of the trough or flume. Fig. 2 is a side view of the same, part being broken away to show the interior construction. Fig. 3 is a cross-section of the trough or flume with its sides covered with cement and gravel, as required in practical use. Fig. 4 is a cross-section of the trough or flume partly filled with gravel and water, as when in actual use.

As shown best in Fig. 1, A indicates a trough, flume, or box, of wood, metal, or other material, of any size, having preferably, however, an accurately uniform cross-section.

S S are screens rigidly fixed near the ends of the flume.

F is a faucet or hose supplying water in different regulated quantities.

O is an overflow, usually rectangular, wide, and with open top, by which surplus water not needed in the experiment is allowed to escape.

U is the upper and L the lower water-reservoir.

T T T are any number of tubes connecting through end of trough with the lower water-reservoir L, usually of thin sheet metal and supplied with corks.

The top of the trough is open for filling and refilling with sand, gravel, &c. The sides, bottom, and ends are made water-tight by a coating $a$ of paint, asphalt, or other suitable cementitious material. The sides and bottom between the screens S S are coated with pitch, paint, stucco, or other suitable material for holding sand or gravel thereto.

To determine the rate of flow in a certain gravel and with a known slope: The pitched sides $a$ and bottom of trough between screens are thoroughly coated with that gravel $x$. The trough is partly filled with water, say to $z$, Fig. 4, and by the water-level, by wedges or screws under either or both ends, or by any other convenient means the proper slope is given to the trough. The space between the screens is filled with the gravel. Water is turned in from F to U and soon saturates the gravel and rises in the lower reservoir L. Enough of the outlet-tubes T T are now uncorked to keep the running water at constant depths in L and U, the depth in U being kept constant by the overflow O, and the depth in L being regulated by corks in tubes T T. When the constancy of depths is established, the efflux from tubes T T for a given time is measured. This efflux divided by the time and by the wet-gravel cross-section (between pitched sides and between pitch bottom and water-surface) gives the rate of flow when rate of fall is the difference between upper and lower water-levels divided by the distance between screens.

Each test is usually several series of experiments. Thus to test the flow in gravel from a certain place, having given the fall of the river at that place, I set the trough A at a corresponding incline. Then twenty to fifty time measurements of the outflow of the trough may be made. The pitching being done and gravel placed in the trough, the latter is set for some other fall and twenty to fifty other determinations are made. So generally with a given material in the trough I would make twenty to fifty determinations for accuracy for each of at least six to eight falls per mile. Then by platting the results I can read off the flow for any fall per mile.

Numerous measurements of efflux may be made for each gravel and each slope and one be checked upon another to insure accuracy.

The top of the trough may be covered temporarily during the stay therein of each gravel to protect against evaporation, but generally this is unnecessary, unless the material be very fine or the slope be very slight.

The necessity for pitching and graveling the sides and bottom is found in the fact that if these three surfaces were not so treated there would be openings between the gravel and the faces of the trough larger than the openings in the interior of the gravel mass. Hence the water would steal its way along the sides and bottom faster than through the mass and the results of the experiments would be valueless.

When the slopes to be tested are slight, the trough may remain level, the lower water-level in L being maintained constant, as before, but at less depth than in U, the difference in depths representing the fall and the rate of flow being based upon the minimum wet-gravel section or that at the lower screen. Results are more accurate, however, when depths in reservoirs are equal.

The main portion of the apparatus may be semicircular or of any form of cross-section, but will generally be rectangular.

The pitch or other material holding the sand or gravel should be at least as thick as one-half the diameter of the larger grains held.

Either of the tubes T T may be used as an overflow of known height, with the tubes below it uncorked sufficiently to keep the lower water-level at just the overflow height. The tubes T T will be placed preferably as shown in Fig. 2, so that no tube will be in the way of efflux from tubes above it.

A vent-plug V may be provided for draining and washing the trough after any experiment. The screens will generally be placed just far enough from ends of trough to allow the arm and hand to enter for removing plug V, measuring depths of water, &c. The longer the trough between screens the more accurate the results.

Screens may be of perforated sheet metal or of cloth, but will generally be of the common form of wire-screening, of brass or iron, suited to sizes of pebbles. The overflow O is not an absolute necessity, but is a convenience in regulating water-supply and water-level in U, especially if flow from F is at all spasmodic.

Screens may be fastened on frames sliding in recesses or grooves cut into sides of trough, but if so constructed the frames must not encroach upon the "wet" or water cross-section of the trough.

In place of the rectangular or semicircular trough a pipe of iron or other material may be coated with sand or gravel, held by means of pitch or other suitable material to the inside thereof. Each end of the pipe may be covered by a screen and may be immersed in a box or other vessel containing water of known height. The pipe then becomes the trough of my apparatus and the boxes the reservoirs. The difficulty of managing this arrangement will be that of replacing one sand or gravel with another properly.

The word "trough" as here used means a trough, box, flume, pipe, or conduit.

I claim and desire to secure by Letters Patent—

The improved water-underflow-testing apparatus, comprising a trough, or flume, having its inner sides coated with pitch or other suitable adhesive material, and being of the same cross-sectional area at all points, a screen arranged near each end, and a series of outlets T, arranged at one end, at different graduated heights, and provided with stoppers, or means, for controlling the escape of water, as shown and described.

HOWARD V. HINCKLEY.

Witnesses:
HAL. W. NEISWANGER,
C. H. SNYDER.